(12) United States Patent
Michels et al.

(10) Patent No.: US 6,911,275 B2
(45) Date of Patent: Jun. 28, 2005

(54) HIGH MOLECULAR WEIGHT DIRECT ANTIFREEZE COOLED FUEL CELL

(75) Inventors: H. Harvey Michels, West Hartford, CT (US); Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 115 days.

(21) Appl. No.: 10/194,122

(22) Filed: Jul. 12, 2002

(65) Prior Publication Data

US 2004/0009383 A1 Jan. 15, 2004

(51) Int. Cl.[7] .............................................. H01M 8/04
(52) U.S. Cl. .............................. 429/26; 429/25; 429/34
(58) Field of Search .............................. 429/24, 25, 26, 429/34, 38, 39

(56) References Cited

U.S. PATENT DOCUMENTS

| | | | |
|---|---|---|---|
| 5,176,966 A | * | 1/1993 | Epp et al. ................... 429/26 |
| 5,700,595 A | | 12/1997 | Reiser |
| 6,093,341 A | | 7/2000 | Minks et al. |
| 6,214,486 B1 | * | 4/2001 | Okamoto ................ 429/34 X |
| 6,316,135 B1 | | 11/2001 | Breault et al. |
| 6,331,366 B1 | | 12/2001 | Van Dine et al. |
| 6,361,891 B1 | | 3/2002 | Breault et al. |
| 6,365,291 B1 | | 4/2002 | Margiott |
| 2003/0198847 A1 | * | 10/2003 | Jeffcoate et al. ............... 429/26 |

OTHER PUBLICATIONS

Internet p. : "Polyethylene Glycols (PEGs)", the Dow Chemical Company, http://www.dow.com/polyglycols/nam/prod/peg (Feb. 2001).*

* cited by examiner

*Primary Examiner*—Stephen J. Kalafut
(74) *Attorney, Agent, or Firm*—Malcolm J. Chisholm, Jr.

(57) ABSTRACT

A high molecular weight direct antifreeze cooled fuel cell 10 includes an electrolyte 52 secured between an anode catalyst 54 and a cathode catalyst 56; a porous anode substrate 58 secured in direct fluid communication with and supporting the anode catalyst 54; a porous wetproofed cathode substrate 62 secured in direct fluid communication with and supporting the cathode catalyst 56; a porous water transport plate 64 secured in direct fluid communication with the porous cathode substrate 62; and, a high molecular weight direct antifreeze solution passing through the porous water transport plate 64 to cool and remove product water from the fuel cell 10. The high molecular weight direct antifreeze solution preferably includes polyethylene glycol having a molecular weight ranging from 200 to 8,000 AMU. The direct antifreeze solution does not leave the water transport plate 64 in significant quantities to poison the catalysts.

6 Claims, 4 Drawing Sheets

HIGH MOLECULAR WEIGHT DIRECT ANTIFREEZE COOLED FUEL CELL

TECHNICAL FIELD

The present invention relates to fuel cells that are suited for usage in transportation vehicles, portable power plants, or as stationary power plants, and the invention especially relates to a fuel cell that utilizes an antifreeze solution passing through the fuel cell to remove heat from the cell.

BACKGROUND ART

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

In operation of PEM fuel cells, the membrane is saturated with water, and the anode electrode adjacent the membrane must remain wet. Product water formed at the cathode electrode is removed from the cell by evaporation or entrainment into a gaseous stream of either the process oxidant or reducing fluid. In fuel cells containing porous reactant flow fields and adjacent porous cooler or water transport plates, as described in U.S. Pat. No. 6,331,366 owned by the assignee of all rights in the present invention, a portion of the water maybe alternatively removed as a liquid through the porous reactant flow field and water transport plate to a circulating cooling fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations. Use of such fuel cells to power a transportation vehicle gives rise to additional problems associated with water management, such as preventing the product water from freezing, and rapidly melting any frozen water during start up whenever the fuel-cell powered vehicle is operated in sub-freezing conditions.

Known fuel cells typically utilize a coolant system supplying a flow of cooling fluid through the fuel cell to maintain the cell within an optimal temperature range. Where the cooling fluid is a solution including water it also must be kept from freezing. It is known to utilize an antifreeze solution such as ethylene glycol and water or propylene glycol and water as a cooling fluid in such coolant systems. However, such antifreeze solutions are known to be adsorbed by and poison the catalysts that form electrodes. Furthermore, those antifreeze solutions that have low surface tensions result in the solutions wetting any wetproofed support layers adjacent to the cell catalysts, thereby impeding diffusion of reactant fluids to the catalysts, which further decreases performance of the electrodes. Also, the vapor pressure of typical antifreezes is too high, resulting in excessive loss rates of the antifreeze solutions through fuel cell exhaust streams or from steam produced in boilers of fuel processing components of fuel cell power plants. Therefore coolant systems of fuel cells that utilize an antifreeze solution are known to be sealed from the electrodes, so that the solution is not in direct fluid communication with the electrodes. Sealing the coolant system from direct fluid communication with the cell and hence with the product water formed at the cathode electrode results in decreased cell performance due to less efficient removal of the product water. Fuel cells with sealed coolant plates typically remove product water as an entrained liquid. This requires a tortuous serpentine flow path with a resultant high pressure drop. An example of such a cell is shown in U.S. Pat. No. 5,773,160. That type of cell is not suitable for operating at near ambient reactant pressure that is a preferred operating pressure for many fuel cell systems. The decreased performance of cells with sealed coolant plates requires that additional cells be used to satisfy the design power requirement. The additional cells combined with heavier coolers associated with sealed coolers results in an increase in weight and volume of a fuel cell power plant, which is undesirable for a fuel cell used to power a vehicle.

Recently, it has been disclosed to utilize a "direct antifreeze solution" that passes through a porous water transport plate so that the direct antifreeze solution is in direct, uninterrupted fluid communication with a cathode catalyst of the fuel cell. Such direct antifreeze solutions are described in U.S. Pat. No. 6,316,135 to Breault et al. that issued on Nov. 13, 2001, U.S. Pat. No. 6,361,891 to Breault et al. that issued on Mar. 26, 2002, and U.S. Pat. No. 6,365,291 to Margiott that issued on Apr. 2, 2002, all of which Patents are owned by the assignee of all rights in the present invention. The direct antifreeze solutions described in those three Patents exhibit thermophysical properties such that they do not excessively poison the cathode or anode catalysts during normal operation of fuel cells utilizing those direct antifreeze solutions.

Exemplary direct antifreeze solutions disclosed in those Patents include "alkanetriol direct antifreeze solutions", such as water and an alkanetriol selected from the group consisting of glycerol, butanetriol, and pentanetriol. Another direct antifreeze solution is characterized in those patents as follows: a "special direct antifreeze solution" having; 1. a freezing point of at least −30 degrees Centigrade (hereafter "° C."); 2. a surface tension greater than 60 dynes per centimeter (hereafter "dyne/cm") at a cell operating temperature of about 65° C.; 3. a partial pressure of antifreeze above the solution at about 65° C. that is less than 0.005 mm of mercury (hereafter "mm Hg"); and, 4. a capacity of being oxidized by catalysts of the fuel cell at fuel cell voltages.

The inventors of the invention described herein undertook extensive experimentation with the direct antifreeze solutions described above, and while performance was enhanced over known antifreeze solution cooling fluids within cells having porous cooler plates, nonetheless performance decay has been observed. In particular, the alkanetriol glycerol was utilized as the direct antifreeze solution within an operating fuel cell, and a performance decay on the order of one-half (0.5) millivolts per hour at about 500 milliamps per square centimeter (hereafter "mASC"). The performance decay was recovered by operating the fuel cell with water as the cooling fluid. The exact decay mechanism is not yet clearly understood. One theory of the performance decay is that it is due to dehydration of the proton exchange membrane or of an ionomer within the catalyst on the membrane. The dehydration may come about because the partial pressure of water above the glycerol direct antifreeze solution is about 80% of the partial pressure of pure water as a cooling fluid. Another theory is that the performance decay is due to absorption of the glycerol direct antifreeze solution onto either the anode or cathode catalysts, thus poisoning the catalysts and reducing their effectiveness.

Accordingly there is a need for a fuel cell that may be operated in sub-freezing conditions by use of a direct antifreeze solution cooling fluid that does not produce any performance decay of the fuel cell, that also minimizes free water within the system that may be frozen when the fuel cell is not operated, and that does not require isolating an antifreeze cooling fluid from the cathode and anode electrodes within a sealed coolant system.

DISCLOSURE OF INVENTION

A high molecular weight direct antifreeze cooled fuel cell is disclosed for producing electrical energy from reducing and process oxidant fluid streams. The fuel cell includes an electrolyte secured between an anode catalyst and a cathode catalyst; a porous anode substrate secured in direct fluid communication with and supporting the anode catalyst; a porous, wetproofed cathode substrate secured in direct fluid communication with and supporting the cathode catalyst; a porous water transport or cooler plate secured in direct fluid communication with the porous cathode substrate; and, a high molecular weight direct antifreeze solution passing through the porous water transport plate.

In operation of the fuel cell, because product water generated electrochemically at the cathode catalyst flows away from the cathode catalyst into the porous cathode substrate and into the porous water transport plate, and because the porous cathode substrate is wetproofed, the high molecular weight direct antifreeze solution passing through the porous water transport plate remains essentially within the water transport plate and does not make substantial liquid contact with the cathode catalyst.

The high molecular weight direct antifreeze is preferably a polyethylene glycol having a molecular weight ranging from 200 to 8,000 atomic mass units (hereafter "AMU"). The high molecular weight direct antifreeze may also be selected from the group consisting of ethylene oxide chains terminated by functional alkyl and/or hydroxyl groups, linear alcohols, branched alcohols, polyethylene glycols, methoxypolyethylene glycols, dimethoxypolyethylene glycols, triethylene glycols, and tetraethylene glycols, and mixtures thereof, each member of the group having a molecular weight ranging from 400 to 8,000 AMU.

An exemplary high molecular weight direct antifreeze is polyethylene glycol having a molecular weight of 400 (hereafter "PEG 400"). PEG 400 produces a direct antifreeze solution with a freezing point of minus twenty (−20) degrees Centigrade (hereafter "° C.") at a concentration of 50.6 weight percent (hereafter "wt. %"), balance water, compared to 45.4 wt. % for glycerol to obtain the same freezing point. However, the corresponding mole fraction that determines thermophysical properties of antifreeze solutions is only 4.4 mole percent for the PEG 400, but 14.5 mole percent for the glycerol for the same −20° C. freezing point of the direct antifreeze solution. The mole fraction of water above such direct antifreeze solutions is one minus the mole fraction of the antifreeze additive. For a solution with a −20° C. freezing point, the mole fraction of water above the PEG 400 solution is 0.956, compared to 0.855 for the glycerol solution. Therefore, the PEG 400 direct antifreeze solution will not dehydrate the proton exchange membrane to the extent observed by the glycerol-based direct antifreeze solutions.

It was expected that such high molecular weight direct antifreezes as polyethylene glycol would not be acceptable because polyethylene glycol has a surface tension of about 52 dynes per centimeter (hereafter, "dyne/cm") at an average fuel cell operating temperature of 60.0° C. As recited above, prior art patents and the inventors herein had concluded that an acceptable direct antifreeze must have a surface tension "greater than 60 dynes per centimeter (hereafter "dyne/cm") at a fuel cell operating temperature . . . " However, after extensive experimentation with potential direct antifreeze solutions, it was discovered that the aforesaid high molecular weight direct antifreeze solutions provide superior performance compared to known direct antifreeze solutions. It is urged that the high molecular weight direct antifreeze solutions provide such unexpected and favorable results despite their low surface tensions at fuel cell operating temperatures because of the low mole fraction of the high molecular weight direct antifreeze required to produce an acceptable direct antifreeze solution.

In preferred embodiments of the high molecular weight direct antifreeze cooled fuel cell, the anode substrate may also be wetproofed to make it hydrophobic thereby further minimizing movement of the liquid antifreeze solution from the water transport plate into contact with the cathode and anode catalysts.

In an additional embodiment, the high molecular weight direct antifreeze solution passing through the water transport plate may be directed to flow at a pressure that is less than a pressure of the process reactant streams passing adjacent water transport plates. A preferred fuel cell operates at near ambient pressure and the process oxidant stream and reducing fluid stream are typically pressurized to 1 to 2 pounds per square inch gauge (hereafter "PSIG") above ambient pressure, and the high molecular weight direct antifreeze solution is directed to flow through the water transport plate at about 1 to 2 PSIG below ambient pressure. Such a positive pressure differential between the process oxidant stream and the direct antifreeze solution within the water transport plate further assists movement of the product water formed at the cathode catalyst through the cathode substrate and into the water transport plate. The positive pressure differential also limits movement of any liquid antifreeze solution flowing within the water transport plate from flowing out of the water transport plate into the higher pressure process reactant streams passing within reactant flow fields defined adjacent to and/or within the porous anode and cathode substrates.

Accordingly it is a general object of the present invention to provide a high molecular weight direct antifreeze cooled fuel cell that overcomes deficiencies of the prior art.

It is a more specific object to provide a high molecular weight direct antifreeze cooled fuel cell that minimizes free liquid water that may freeze when the fuel cell is operating in sub-freezing conditions.

These and other objects and advantages of the present direct antifreeze cooled fuel cell will become more readily apparent when the following description is read in conjunction with the accompanying drawings.

DESCRIPTION OF THE PREFERRED EMBODIMENTS

Figure 1:
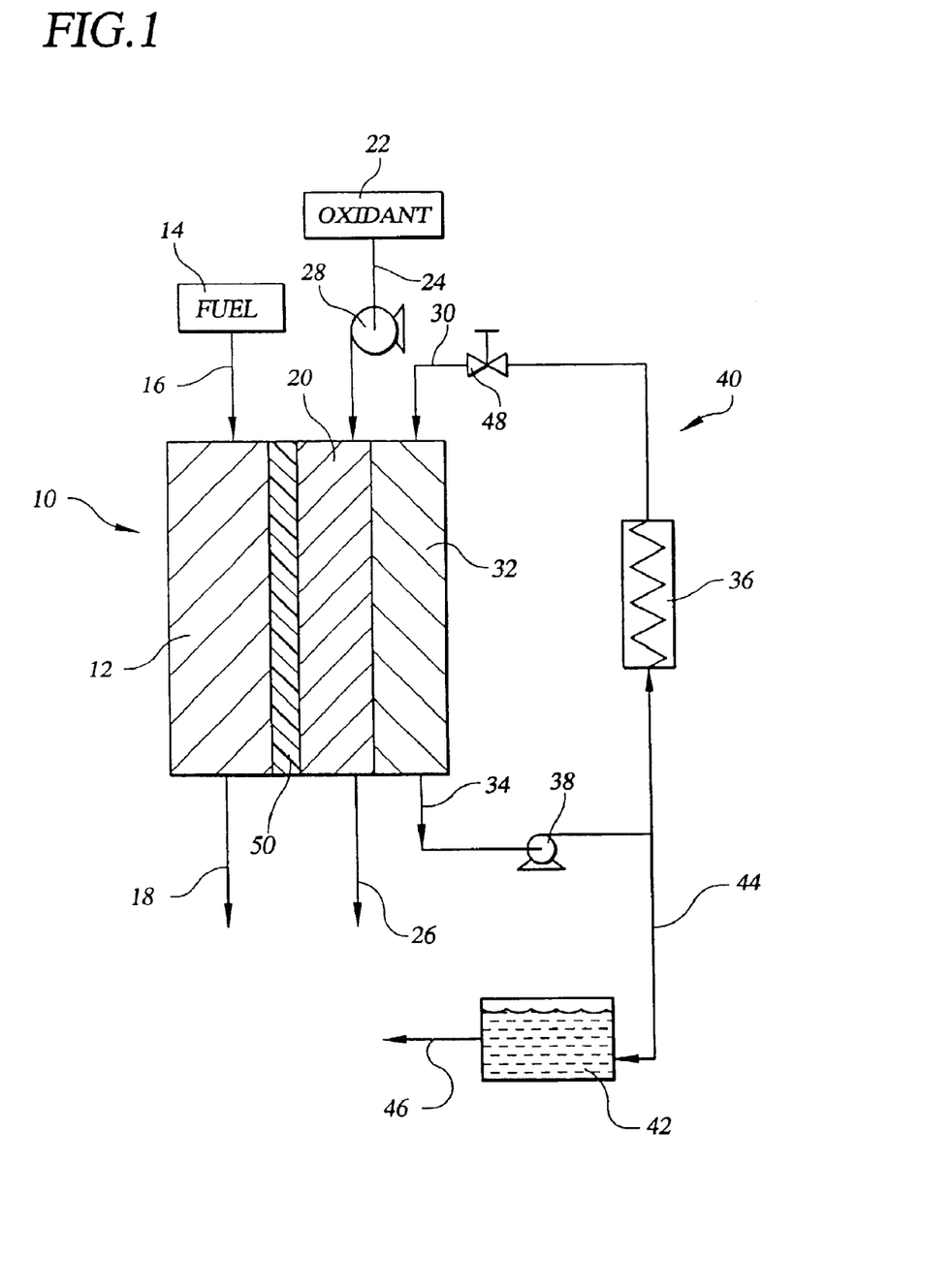
FIG. 1 is a schematic representation of a high molecular weight direct antifreeze cooled fuel cell constructed in accordance with the present invention.

Referring to the drawings in detail, a direct antifreeze cooled fuel cell of the present invention is shown in FIG. 1, and is generally designated by the reference numeral 10. The cell 10 includes an anode flow field 12 that receives a reducing fluid directed from a fuel supply component 14 through a fuel passage 16 to flow through the anode flow field 12 and leave the cell 10 through a reducing fluid vent 18. The cell 10 also includes a cathode flow field 20 that receives a process oxidant stream directed from an oxidant supply component 22 through an oxidant passage 24 to flow through the cathode flow field 20 and out of the cell 10 through an oxidant vent 26. An oxidant blower 28 may be positioned on the oxidant passage 24 to variably flow the gaseous oxidant stream into the fuel cell 10.

A cooling fluid such as a high molecular weight direct antifreeze solution is directed through a coolant feed line 30 into a porous water transport or cooler plate 32 of the fuel cell 10 adjacent the cathode flow field 20, and out of the fuel cell 10 in a coolant discharge line 34. The water transport plate 32 also serves to cool the cell and may be referred to occasionally as a cooler plate or water transport plate. The coolant feed line 30 and coolant discharge line 34 may be in fluid communication with a coolant heat exchanger 36 to cool the cooling fluid, such as a radiator type of heat exchanger common to automobiles.

A coolant pump 38 may be secured to the coolant feed line 30 to pump the cooling fluid into the water transport plate 32, coolant discharge line 34, and coolant heat exchanger 36. When the coolant feed line 30, water transport plate 32, coolant discharge line 34 and coolant heat exchanger are in fluid communication as shown schematically in FIG. 1, those components may be characterized as a coolant loop 40, wherein the cooling fluid is described as a cooling fluid such as a high molecular weight direct antifreeze solution circulating through the water transport plate 32 and circulating through the coolant loop 40. Alternatively, the coolant feed line 30 may direct the cooling fluid to pass through the water transport plate without cycling through the coolant loop 40. In such an embodiment, the cooling fluid may be part of an elaborate fuel cell water management system (not shown). A cooling fluid accumulator means 42 for accumulating liquid cooling fluid may also receive some of the cooling fluid and any product water formed within the fuel cell 10 and flowing through the water transport plate 32, coolant discharge line 34 and an accumulator feed line 44. The cooling fluid accumulator means 42 may be well-known accumulator for directing the accumulated cooling fluid and fuel cell product water through an accumulator discharge line 46 so that the cooling fluid and product water may be directed to a cell humidification system (not shown), fuel processing components (not shown), or other components associated with fuel cell power plants as is well-known in the art. The accumulator also accommodates changes in cooling fluid volume due to changes in operating conditions.

The fuel cell 10 may also include a pressure control means for maintaining a positive pressure differential between the process oxidant stream passing through the fuel cell 10 within the cathode flow field 20 and the cooling fluid passing through the cell 10 within the water transport plate 32. The pressure control means may include the coolant pump 38 coordinated with a pressure control valve means for maintaining a specific pressure of the cooling fluid within the coolant feed line 30 down stream of the valve means, water transport plate 32 and coolant discharge line 34, such as pressure control valve 48 secured to the coolant feed line 30 between the coolant pump 38 and the water transport plate 32. As is well-known, the pressure control valve 48 may be set manually, automatically, or, for example, may be electromechanically adjusted based upon a reference pressure within the process oxidant stream within the cathode flow field 20 to restrict flow through the valve 48 so that the stream of cooling fluid drawn into the coolant pump 38 from the coolant feed line 30, water transport plate 32, coolant discharge line 34 and coolant heat exchanger 36 is at a pressure lower than the pressure of the process oxidant stream within the cathode flow field 20. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention. The materials making up the coolant loop 40 may be manufactured of standard materials well-known in the art such as heat exchangers common to automobile technology, and piping and valves well-known in the chemical process industry.

The fuel cell 10 also includes a membrane electrode assembly 50 (hereafter occasionally referred to as "M.E.A." for convenience) secured between the anode flow field 12 and cathode flow field 20 that facilitates an electrochemical reaction involving the reducing fluid and oxidant stream to generate electrical energy that is conducted through a standard circuit (not shown) to an energy consuming load, such as an electric motor (not shown) to power, for example, a transportation vehicle (not shown). It is also well known to secure the fuel cell 10 adjacent a plurality of similar fuel cells (not shown) to form a cell stack assembly enclosed within a frame structure that defines manifolds for directing the reducing fluid, process oxidant, and cooling fluid streams into and out of the fuel cell 10 in a manner well known in the art.

Figure 2:
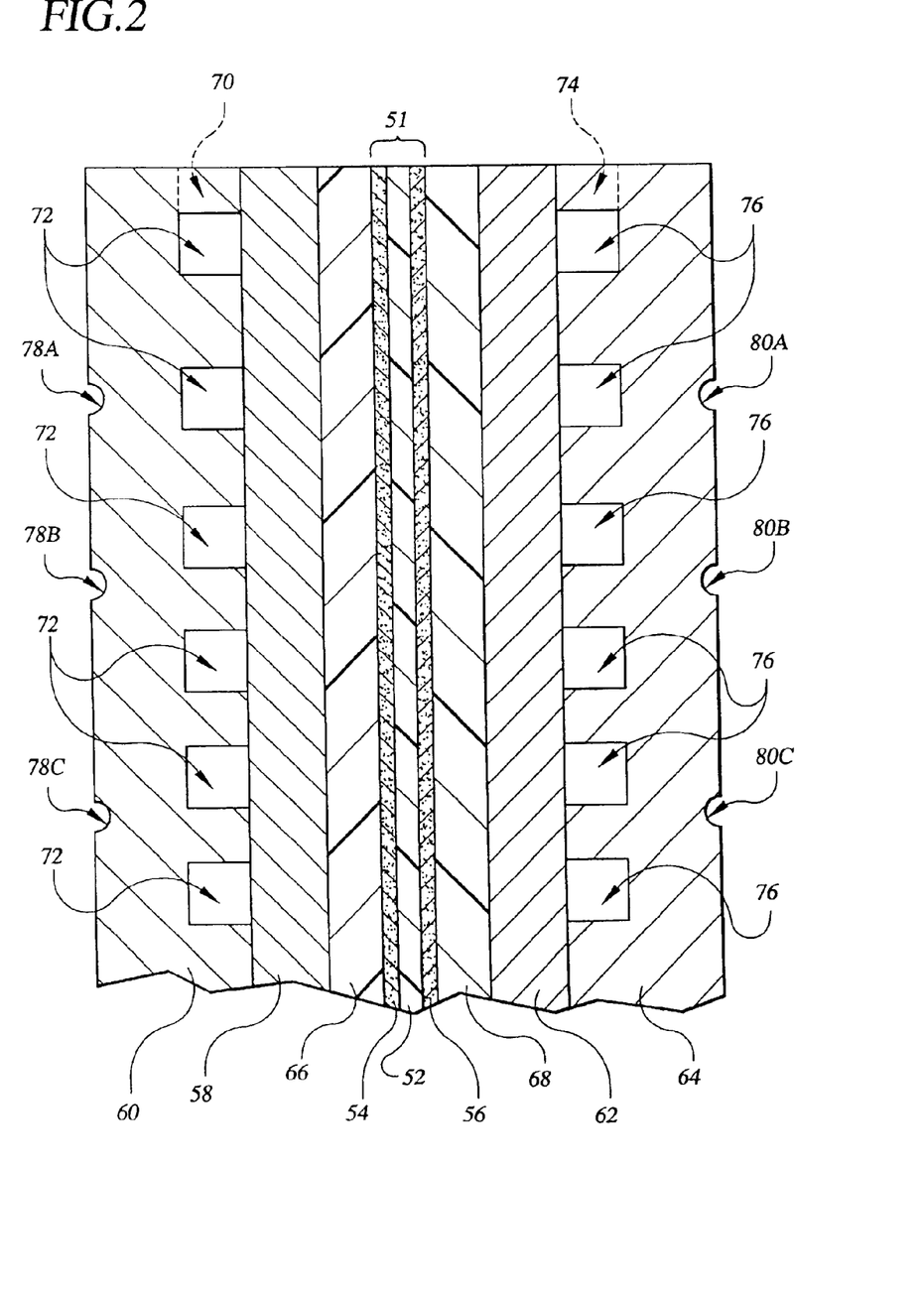
FIG. 2 is a schematic, cross-section, fragmentary view of fuel cell components of a high molecular weight direct antifreeze cooled fuel cell of the present invention showing a membrane electrode assembly, anode and cathode substrates, and anode and cathode water transport plates.

An M.E.A. 51 is shown in greater detail in FIG. 2, and for purposes herein is defined to include an electrolyte 52 such as a proton exchange membrane ("PEM"), an anode catalyst 54, and a cathode catalyst 56 secured on opposed sides of the electrolyte 52. The fuel cell 10 also includes a wetproofed anode support means that is secured in direct fluid communication with the anode catalyst 54 between an anode water transport plate 60 and the anode catalyst 54 for passing the reducing fluid stream adjacent the anode catalyst 54. The wetproofed anode support means may include one or more porous layers, such as a porous anode substrate 58, a porous anode diffusion layer 66, or both the porous anode substrate 58 and porous anode diffusion layer 66 secured adjacent each other between the anode water transport plate 60 and anode catalyst 54, wherein at least one of the porous layers is wetproofed and hydrophobic.

The fuel cell 10 also includes a wetproofed cathode support means that is secured in direct fluid communication with the cathode catalyst 56 between a cathode water transport plate 64 and the cathode catalyst 56 for passing the process oxidant stream adjacent the cathode catalyst 56. The wetproofed cathode support means may include one or more porous layers, such as a porous cathode substrate 62, a porous cathode diffusion layer 68, or both the porous cathode substrate 62 and porous cathode diffusion layer 68 secured adjacent each other between the cathode water transport plate 64 and cathode catalyst 56, wherein at least one of the porous layers is wetproofed and hydrophobic. The porous cathode substrate 62 and porous anode substrate 58 may be porous carbon-carbon fibrous composites having a porosity of about 65% to about 75%, and may be wetproofed by a hydrophobic substance such as "TEFLON" brand polytetrafluoroethylene (hereafter "PTFE") to a concentration of approximately 0.18 grams per cubic centimeter by a wetproofing method known in the art. "TEFLON" brand "PTFE" may be acquired from the E. I. DuPont Company, of Wilmington, Del. The porous cathode gas diffusion layer 68 and porous anode diffusion layer 66 may be about a 50% carbon material and about 50% hydrophobic material such as the TEFLON" brand "PTFE", or fluorinated ethylene propylene "FEP".

The porous cathode water transport plate 64 is in direct fluid communication with the porous cathode substrate 62, porous cathode diffusion layer 68 and the cathode catalyst 56. Similarly, the porous anode water transport plate 60 is in direct fluid communication the porous anode substrate 58, porous anode diffusion layer 66 and the anode catalyst 54.

It is pointed out that an anode flow field (shown schematically in the FIG. 1 embodiment at reference numeral 12), may consist, in the FIG. 2 schematic representation, of a fuel inlet 70, and a plurality of fuel flow channels 72 defined within the anode water transport plate 60. Similarly, a cathode flow field may consist of an oxidant inlet 74, and a plurality of oxidant flow channels 76 defined within the cathode water transport plate 64. The anode flow field 12 and cathode flow field 20 may also consist of cavities, differing channels or grooves well-known in the art and defined within fuel cell components to direct the fuel and process oxidant streams to pass in contact with the anode and cathode catalysts 54, 56. As shown in FIG. 2, the porous anode and cathode water transport plates 60, 64 may be structured to cooperate with adjacent water transport plates (not shown) so that anode side coolant channels 78A, 78B and 78C defined within the anode water transport plate 60, and cathode side coolant channels 80A, 80B, and 80C defined within the cathode water transport plate 64 may cooperate in mirror-image association with coolant channels of the adjacent water transport plates of adjacent fuel cells (not shown) in a cell stack assembly to form a network of coolant channels for delivering a cooling fluid stream to the water transport plates 60, 64.

In operation of the fuel cell 10, the anode side coolant channels 78A, 78B, 78C and cathode side coolant channels 80A, 80B, 80C are in fluid communication with the coolant feed channel 30 and coolant discharge line 34, so that a cooling fluid stream from the coolant feed channel 30 passes through the anode and cathode coolant channels, and into the anode and cathode water transport plates 60, 64 to saturate the pore volume of the water transport plates. The cooling fluid stream then passes into the coolant discharge line 34. By filling the open pore volume of the anode and cathode water transport plates, the cooling fluid or high molecular weight direct antifreeze solution stream forms a gas barrier or seal preventing the gaseous reducing fluid in the reducing fluid fuel channels 72 from flowing into oxidant channels in an adjacent cell. By wetproofing the porous anode substrate 58 layer and/or porous anode diffusion layer 66, the liquid antifreeze solution is restricted from moving out of the anode water transport plate 60 and passing through the anode substrate and diffusion layers 58, 66 into contact with the anode catalyst 54.

Similarly, by wetproofing the porous cathode substrate layer 62 and/or cathode diffusion layer 68, the liquid high molecular weight direct antifreeze solution coolant stream is prevented from moving out of the cathode water transport plate 64 and passing through the cathode substrate and cathode diffusion layer and into contact with the cathode catalyst 56. Additionally, as the fuel cell 10 operates, product water formed at the cathode catalyst 56 is removed as water vapor or liquid into the process oxidant stream flowing through the cathode flow field or oxidant channels 76 defined within the cathode water transport plate 64. Therefore, much of the product water moves out of the cathode flow field 76 and into the antifreeze solution coolant stream passing through the porous cathode water transport plate 64, especially when the pressure control valve 48 is causing a positive pressure differential between the process oxidant stream within the cathode flow field and the antifreeze coolant stream within the cathode water transport plate 64.

It is stressed that by the phrase "in direct fluid communication with", it is meant that there are no physical barriers between respective components. For example, in the direct antifreeze cooled fuel cell 10, the porous cathode substrate 62 is secured in direct fluid communication with the cathode catalyst 56, and the cathode water transport plate 64 is secured in direct fluid communication with porous cathode substrate 62. Consequently, there are no solid barriers to gaseous and/or liquid flow between the cathode water transport plate and the cathode catalyst. For example, it is known to utilize a semi-permeable membrane that restricts gaseous flow, but permits selective liquid communication between components on opposed sides of the membrane for purposes of humidifying gaseous reactant streams, etc. With the direct antifreeze cooled fuel cell 10, no such physical barriers are positioned between the cathode water transport plate 64 and the cathode catalyst 56, and no such barriers are positioned between the anode water transport plate 60 and the anode catalyst 54.

The high molecular weight direct antifreeze is preferably a polyethylene glycol having a molecular weight ranging from 200 to 8,000 AMU. The high molecular weight direct antifreeze may also be selected from the group consisting of ethylene oxide chains terminated by functional alkyl or hydroxyl groups, linear alcohols, branched alcohols, polyethylene glycols, methoxypolyethylene glycols, dimethoxypolyethylene glycols, triethylene glycols, and tetraethylene glycols, and mixtures thereof, each having a molecular weight ranging from 400 to 8,000 AMU.

In searching for an improved direct antifreeze, the inventors herein compared properties of a known indirect antifreeze, ethylene glycol, a known direct antifreeze, glycerol, and three (3) forms of polyethylene glycol having differing molecular weights, at a proposed operating temperature of a fuel cell of 60° C. Relevant data developed by the inventors is presented in Table 1 below, wherein: "PEG" means "polyethylene glycol"; "PEG200", "PEG300", and "PEG400" mean "polyethylene glycol with molecular weights respectively of about 200, 300, 400; "E", as in 9.1E-4, means 9.1 times 10 to the minus fourth power.

TABLE 1

| COMPOUND: | ETHYLENE GLYCOL | GLYCEROL | PEG200 | PEG300 | PEG400 |
|---|---|---|---|---|---|
| 1. Molecular Wt. | 62.07 | 92.09 | 190–210 | 285–315 | 380–420 |
| 2. Boiling Pt. °C. | 197.3 | 290.0 | 328.0 | Greater than 350 | Greater than 350 |
| 3. Concentration for −20° C. freeze protection | | | | | |
| A. Weight % | 36.7 | 46.4 | 50.0 | 50.3 | 50.6 |
| B. Mole % | 14.4 | 14.5 | 8.2 | 5.7 | 4.4 |
| 4. Concentration for −40° C. freeze protection | | | | | |
| A. Weight % | 52.3 | 63.2 | 59.6 | 59.2 | 58.8 |
| B. Mole % | 24.1 | 25.2 | 11.6 | 8.0 | 6.0 |
| 5. Properties for −20° C. freeze protection | | | | | |
| A. Surface Tension at 60° C., in dynes/cm. | 45.0 | 65.4 | 52.0 | 52.0 | 52.0 |
| B. Viscosity at 60° C. (cp) | 1.2 | 12.2 | 2.8 | 3.3 | 3.8 |
| C. Solution vapor pressure at 60° C. (mm Hg.) | 128.2 | 131.3 | 137.2 | 141.0 | 142.9 |
| D. Partial Pressure of antifreeze additive above the solution at 60° C. (mm Hg.) | 2.7E−1 | 9.1E−4 | 6.3E−5 | 6.1E−8 | 2.8E−9 |
| E. Relative humidity | 85.6 | 85.5 | 91.8 | 94.3 | 95.6 |

Figure 3:
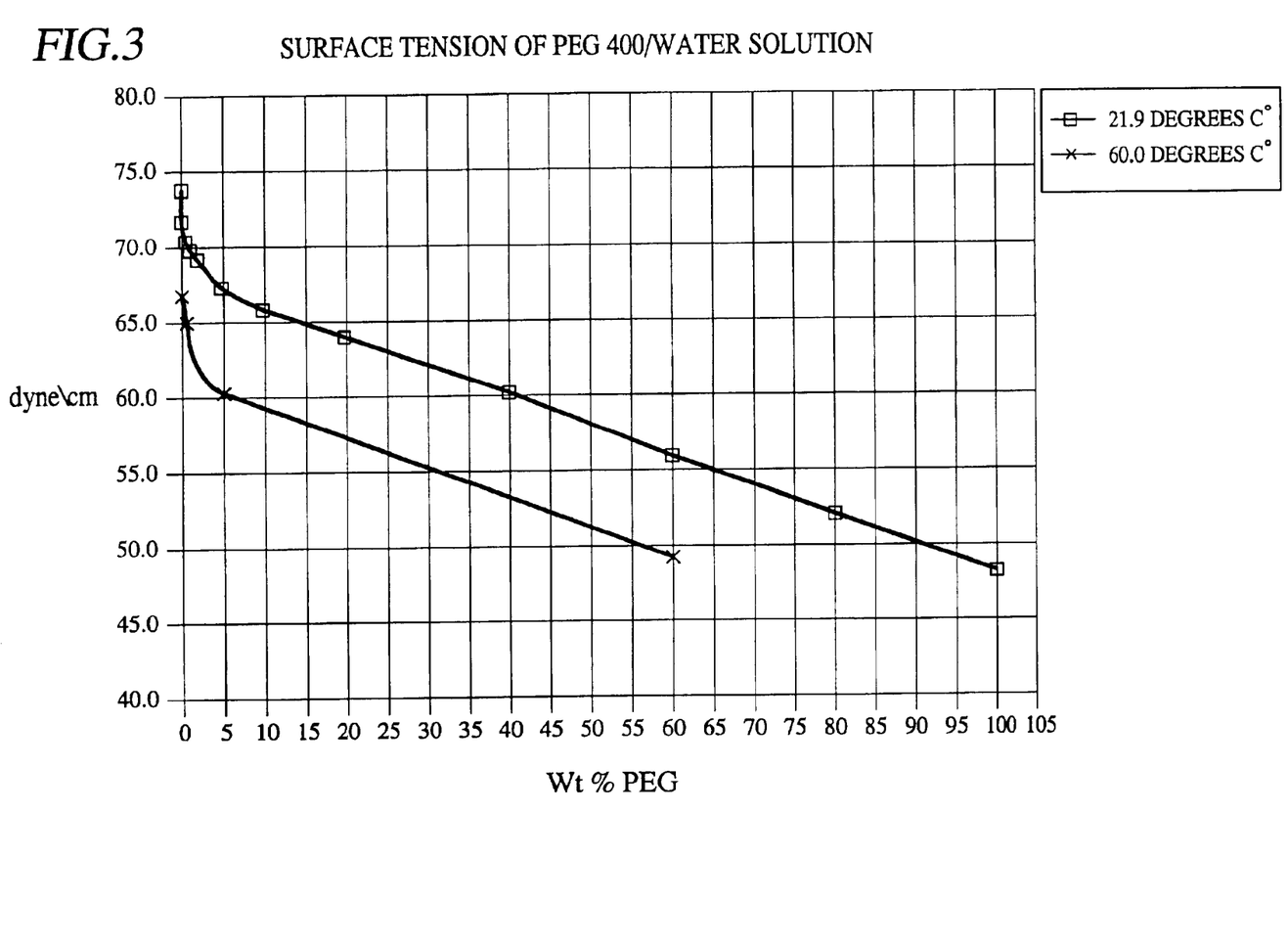
FIG. 3 is graph showing surface tension of a high molecular weight direct antifreeze solution of the present invention at two operating temperatures, and at various concentrations of the high molecular weight direct antifreeze water solution.

During their investigations, and based upon the above cited prior art patents, the inventors believed an acceptable direct antifreeze would have to exhibit a surface tension greater than 60 dynes/cm at an operating temperature of a fuel cell. It was discovered, however, that despite the PEG 200, PEG 300 and PEG 400 having surface tensions, as indicated above, that are less than 60 dynes/cm at an operating temperature of a fuel cell, they nonetheless exhibited very modest mole percent concentrations in order to achieve a −20° C. freezing point. As shown in FIG. 3, the surface tension of a PEG 400 and water high molecular weight direct antifreeze solution decreases to about 52 dynes/cm at 60.0° C. when the PEG 400 concentration reaches a 50% weight concentration. FIG. 3 also shows that the surface tension of the PEG 400 and water direct antifreeze solution also descend below 60 dynes/cm to about 57 dynes/cm when a 50 wt % PEG 400 and water solution are tested at 22° C.

This shows that the PEG 400 high molecular weight direct antifreeze solutions would not be expected to act as an effective direct antifreeze because its surface tension is sufficiently low to partially wet the anode and cathode support means. Additionally, it is unknown in the art that any polyethylene glycol solutions with molecular weights over 200 are being used in non-closed coolant or heat exchange systems. As is well known in the art, more common usage of polyethylene glycols is for ointment bases, gelatin capsules, and suppositories, etc. in the pharmaceutical industry; for creams, deodorants, body lotions, lipsticks, toothpastes, soaps, etc. in the cosmetics/body care industry; for softeners, conditioning agents, emulsifiers, components for lubricants in the textile and leather industry; for release agents in the rubber industry; for lubricants for air bags and bladders; and for transferring heat in electrically treated vulcanizing units and immersion baths. Therefore, the inventors herein were surprised at the unexpected, favorable results of utilizing the PEG 400 as a direct antifreeze with water within a fuel cell.

An exemplary high molecular weight direct antifreeze is polyethylene glycol having a molecular weight of about 400 ("PEG 400"). For purposes herein, the phrase "a molecular weight of about" means plus or minus 5%, or a molecular weight from 380-420. PEG 400 produces a direct antifreeze solution with a freezing point of minus twenty (−20) degrees Centigrade (hereafter "° C.") at a concentration of 50.6 weight percent (hereafter "wt. %"), balance water, compared to 45.4 wt. % for glycerol to obtain the same freezing point. However, the corresponding mole fraction that determines thermophysical properties of antifreeze solutions is only 4.4 mole percent for the PEG 400 solution, but 14.5 mole percent for the glycerol solution for the same −20° C. freezing point of the direct antifreeze solution. The mole fraction of water above such direct antifreeze solutions is one minus the mole fraction of the antifreeze additive. For a solution with a −20° C. freezing point, the mole fraction of water above the PEG 400 solution is 0.956, compared to 0.855 for the glycerol solution. Consequently, the PEG 400 direct antifreeze solution will not dehydrate the proton exchange membrane to the extent observed by the glycerol-based direct antifreeze solutions.

As shown above in Table 1, the partial pressure of the PEG direct antifreezes is significantly lower than the partial pressure of glycerol and ethylene glycol. The partial pressure of the preferred PEG 400 is estimated to be about 3 times 10 to the fourth power lower than the partial pressure of glycerol at an operating temperature of a fuel cell, or about 60.0° C. Additionally, the vapor pressure of PEG 400 above a −20° C. freezing point PEG 400 solution is significantly lower than a vapor pressure of glycerol above a −20° C. freezing point glycerol solution because of the lower mole fraction of the PEG 400 within the PEG 400 high molecular weight direct antifreeze solution compared to the mole fraction of glycerol within the glycerol direct antifreeze solution. It is estimated by the inventors herein that the vapor pressure of a PEG 400 solution above a −20° C. freezing point PEG 400 solution is about 1/100,000 of the vapor pressure of glycerol over a −20° C. freezing point glycerol direct antifreeze solution.

It has also been determined that a gas phase diffusion coefficient of PEG 400 is approximately one-half of that of glycerol, which will further reduce transfer of the PEG 400 from the high molecular weight direct antifreeze solution to electrodes that are in direct fluid communication with the solution. The lower gas phase diffusion coefficient is based mainly upon a higher molecular weight of the PEG 400 and a larger molecular size of the PEG 400 compared to glycerol molecules. While the exact molecular size of hydrated PEG 400 is not presently known, it is estimated that the size may be the same or larger than diameters of ionic channels within the membrane electrolyte 52 of the membrane electrode assembly 51, and of ionic channels within standard membranes in PEM fuel cells. Because the PEG 400 molecule is larger than the diameters, their movement through such ionic channels is restricted, thus further limiting transport across and contamination of the membrane electrolyte and adjacent electrode catalysts.

Figure 4:
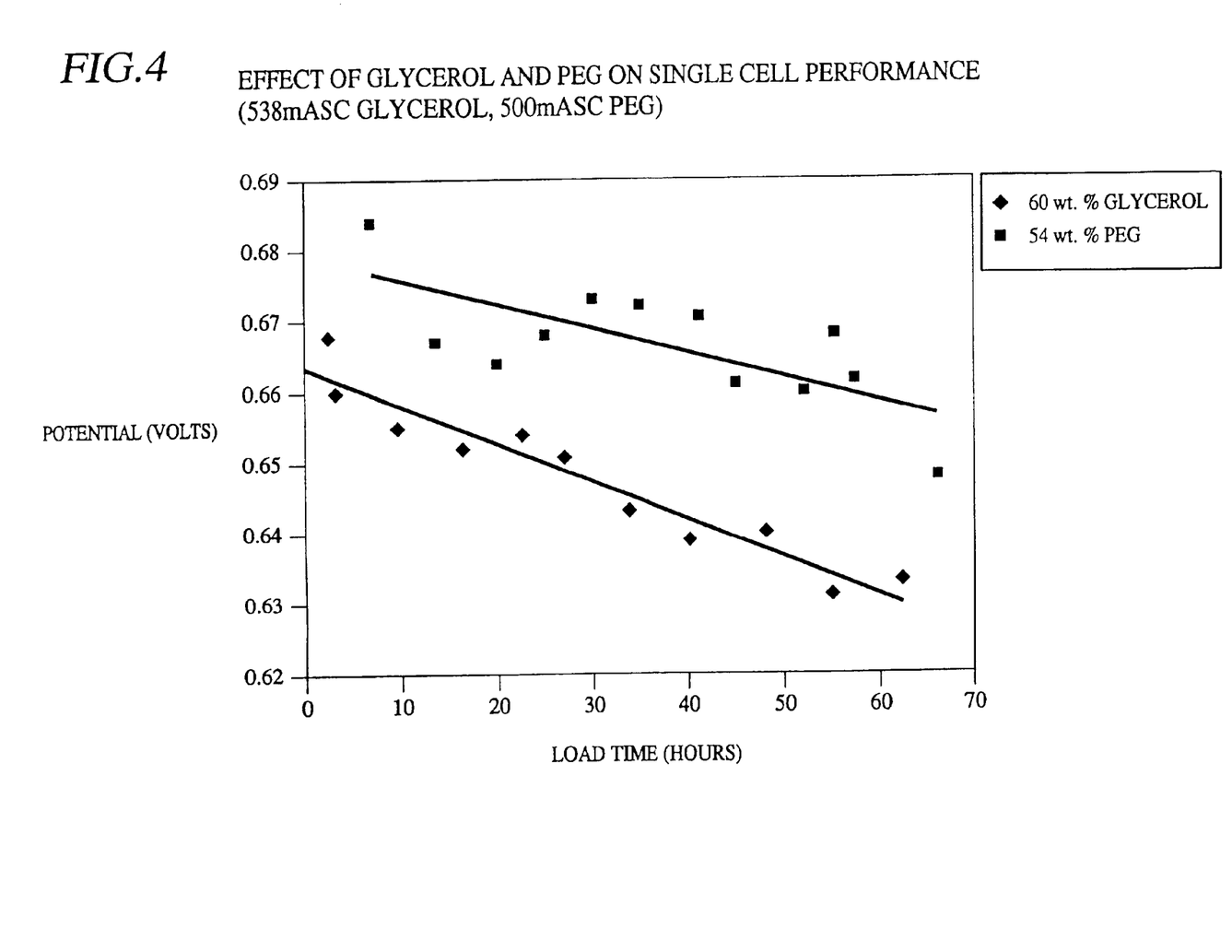
FIG. 4 is a graph comparing the effect on fuel cell potential over time of a known glycerol direct antifreeze solution and a high molecular weight direct antifreeze solution of the present invention

As shown in FIG. 4, an exemplary single cell PEM fuel cell was operated using PEG 400 and glycerol. The exemplary single cell PEM fuel cell was the same as an exemplary cell described in the aforesaid U.S. Pat. No. 6,316,135. As is clear for the plot in FIG. 4 of performance data, the glycerol direct antifreeze solution caused a significantly greater performance decay than did the PEG 400 high molecular weight direct antifreeze solution.

During operation of the direct antifreeze cooled fuel cell 10, product water generated at the cathode catalyst 56 flows into the porous cathode water transport plate 64, the cathode side coolant channels 80A, 80B, 80C, and out of the cell in the coolant discharge line 34 that is in fluid communication with the cathode side channels 80A, 80B, 80C. It is noted that much of the product water generated at the cathode catalyst 56 will also move out of the cell 10 with the process oxidant stream through the oxidant vent 26. Some of the product water within the coolant discharge line 34 that is mixed with the antifreeze solution cooling fluid will move through the accumulator feed line 44 into the accumulator 42, where it may be distributed through the accumulator discharge line 46 to be used by the fuel cell 10 to humidify the reducing fluid and/or process oxidant stream, or to supply steam for a boiler (not shown) of a fuel processing (not shown), well-known in the art.

In such a case, some of the antifreeze solution would enter the anode flow field within the fuel channels 72. Additionally, antifreeze solution passing through the anode side coolant channels 78A, 78B, 78C also passes into the anode water transport plate 60 which is in direct fluid communication with the anode catalyst 54. By wetproofing the porous anode substrate 58 and/or the porous anode diffusion layer 66 in the manner described above in the exemplary tests, the antifreeze solution within the porous anode water transport plate and the fuel channels 72 is restricted from moving into contact with the anode catalyst 54. Consequently, it can be seen that in the high molecular weight direct antifreeze cooled fuel cell 10 almost all water is exposed to the high molecular weight direct antifreeze solution, and hence will not freeze during operation of the cell, or during cell shut down. The water within the electrolyte is not exposed to the high molecular weight direct antifreeze solution, however during operation of the cell 10, heat is generated by the well-known electrochemical reactions that prevent any freeze problems for water within the electrolyte. During shut down of the direct antifreeze fuel cell 10, a portion of the relatively small amount of water within the electrolyte will evaporate and pass as a vapor through the adjacent porous anode and cathode diffusion and substrate layers into the cathode and anode water transport plates 64, 60, and simultaneously some of the antifreeze solution will evaporate and move into the electrolyte 52 to lower the freezing temperature of a solution remaining in the electrolyte, thus also minimizing freezing and subsequent melt requirements for start up of the fuel cell 10. Upon start up, any high molecular weight direct antifreeze solution adsorbed by the cell anode and cathode catalysts 54, 56, or contained in the electrolyte 52, will be oxidized by the anode and cathode catalysts by the cell potentials during a start up procedure.

Accordingly, it can be seen that the unique physical and chemical properties of the high molecular weight direct antifreeze cooled fuel cell 10 cooperate to produce an unexpected result that using a high molecular weight direct antifreeze solution as a cooling fluid in direct fluid communication with cell anode and cathode catalysts 54, 56 does not significantly decrease cell performance. Moreover, the high molecular weight direct antifreeze cooled fuel cell 10 dramatically enhances overall fuel cell efficiency by enabling the fuel cell 10 to be operated in sub-freezing conditions without need for complicated, costly, heavy, large sealed coolant system components and/or a reducing and process oxidant stream humidification system that requires purification of membrane barrier components to isolate the antifreeze solution from the fuel cell anode and cathode catalysts 54, 56.

While the present invention has been described and illustrated with respect to a particular construction of a high molecular weight direct antifreeze cooled fuel cell 10, it is to be understood that the fuel cell is not to be limited to the described and illustrated embodiments. For example, while the test results of the exemplary fuel cell described above are for a cell utilizing a PEM electrolyte, the fuel cell 10 may use alternative electrolytes known in the art. Additionally, while the illustrated embodiment shows an anode diffusion layer 66 between the anode substrate 58 and the anode catalyst 54, and shows a cathode diffusion layer 68 between the cathode substrate 62 and the cathode catalyst 56, it is to be understood that in an alternative embodiment of the fuel cell 10 the diffusion layers 66, 68 may be eliminated, and the cathode substrate 62 and anode substrate 58 may be secured adjacent to and supporting the cathode catalyst 56 and anode catalyst 54 respectively. When both substrate 58, 62 and diffusion 66, 68 layers are utilized, wetproofing of one such layer on either side of the electrolyte may be eliminated, provided at least one porous, wetproofed layer remains between the antifreeze contained in the water transport plates and the anode and/or cathode catalyst. Additionally, while the required properties for a high molecular weight direct antifreeze solution have been described relative to a fuel cell operating at about 60° C., it is to be understood that the required properties are independent of the operating temperature of the fuel cell 10, unless stated otherwise. As a further example, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. A high molecular weight direct antifreeze cooled fuel cell 10 for producing electrical energy from a reducing fluid and a process oxidant stream, comprising:

a. an electrolyte 52 secured between an anode catalyst 54 and a cathode catalyst 56;

b. a porous anode substrate 58 secured in direct fluid communication with the anode catalyst 54 for passing the reducing fluid stream adjacent the anode catalyst 54 and a wetproofed cathode support means 62 secured in direct fluid communication with the cathode catalyst 56 for passing the process oxidant stream adjacent the cathode catalyst 56;

c. a porous water transport plate 64 secured in direct fluid communication with the wetproofed cathode support means 62; and,     d. a high molecular weight direct antifreeze solution passing through the porous water transport plate 64 for cooling the fuel cell 10, wherein the high molecular weight direct antifreeze solution is a solution including polyethylene glycol having a molecular weight of between about 200 AMU and about 400 AMU.

2. The high molecular weight direct antifreeze cooled fuel cell 10 of claim 1, wherein the fuel cell includes a pressure Control means 48 for maintaining a positive pressure differential between the process oxidant stream passing through the fuel cell 10 and the high molecular weight direct antifreeze solution passing through the porous water transport plate 64 so that the process oxidant stream within the fuel cell 10 is at a greater pressure than the antifreeze solution within the water transport plate 64.

3. The high molecular weight direct antifreeze cooled fuel cell 10 of claim 1, wherein the wetproofed cathode support means includes a wetproofed cathode diffusion layer 68 secured between a wetproofed cathode substrate 62 end the cathode catalyst 56.

4. The high molecular weight direct antifreeze cooled fuel cell 10 of claim 1, wherein the wetproofed cathode support means includes a wetproofed Cathode diffusion layer 68 secured between a cathode substrate 62 and the cathode catalyst 56.

5. The high molecular weight direct antifreeze cooled fuel cell 10 of claim 1, wherein the electrolyte 52 is a proton exchange membrane.

6. A high molecular weight direct freeze cooled fuel cell 10 for producing electrical energy from a reducing fluid and a process oxidant, comprising:

a. an electrolyte 52 secured between an anode catalyst 54 and a cathode catalyst 56;

b. a wetproofed anode support means 58 secured in direct fluid communication with the anode catalyst 54 for passing the reducing fluid stream adjacent the anode catalyst 54 and a wetproofed cathode support 62 means secured in direct fluid communication with the cathode catalyst 56 for passing the process oxidant stream adjacent the cathode catalyst 56;

c. a porous anode water transport plate 60 secured in direct fluid communication with the wetproofed anode substrate means 58, and a porous cathode water transport plate 64 secured in direct fluid communication with the wetproofed cathode support means 62; end d. a high molecular weight direct antifreeze solution passing through the porous anode and cathode water transport plates 60, 64 for cooling the fuel cell 10, wherein the high molecular weight direct antifreeze solution is a solution including polyethylene glycol having a molecular weight of between about 200 AMU and about 400 AMU.

* * * * *